US006773625B2

(12) United States Patent
Falk et al.

(10) Patent No.: US 6,773,625 B2
(45) Date of Patent: Aug. 10, 2004

(54) DRY BLEACH COMPOSITIONS

(75) Inventors: Nancy Ann Falk, Livingston, NJ (US); Pamela Chau Lam, Congers, NY (US)

(73) Assignee: Unilever Home & Personal Care USA, division of Conopco, Inc., Greenwich, CT (US)

( * ) Notice: Subject to any disclaimer, the term of this patent is extended or adjusted under 35 U.S.C. 154(b) by 24 days.

(21) Appl. No.: 10/227,960

(22) Filed: Aug. 26, 2002

(65) Prior Publication Data

US 2004/0036057 A1 Feb. 26, 2004

(51) Int. Cl.[7] .......................... C01B 15/12; C01B 35/12; C11D 7/54; C11D 9/42

(52) U.S. Cl. .................. 252/186.43; 423/281; 423/279; 510/368; 510/197; 510/240; 510/309; 510/378

(58) Field of Search .......................... 252/186.3, 186.31, 252/186.43; 510/309, 378, 368, 197, 240; 423/281, 279

(56) References Cited

U.S. PATENT DOCUMENTS

| | | | | | |
|---|---|---|---|---|---|
| 3,950,276 | A | * | 4/1976 | Grand | 510/352 |
| 4,391,727 | A | | 7/1983 | Benz | 252/99 |
| 4,650,599 | A | | 3/1987 | Farnworth et al. | 252/99 |
| 4,814,110 | A | * | 3/1989 | Fong et al. | 554/164 |
| 4,849,125 | A | * | 7/1989 | Seiter et al. | 510/443 |
| 4,959,187 | A | * | 9/1990 | Fong et al. | 554/1 |
| 4,969,927 | A | * | 11/1990 | Schumann et al. | 8/159 |
| 4,970,058 | A | | 11/1990 | Hills et al. | 423/415 |
| 5,182,054 | A | * | 1/1993 | Bauer et al. | 264/15 |
| 5,292,446 | A | | 3/1994 | Painter et al. | 252/99 |
| 5,328,634 | A | * | 7/1994 | Zielske | 252/186.27 |
| 5,362,413 | A | | 11/1994 | Kaufmann et al. | 252/174 |
| 5,380,457 | A | * | 1/1995 | Zielske | 252/186.38 |
| 5,384,062 | A | * | 1/1995 | Eoga et al. | 510/116 |
| 5,482,642 | A | | 1/1996 | Agar et al. | 252/90 |
| 5,486,304 | A | * | 1/1996 | Eoga et al. | 510/102 |
| 5,597,789 | A | | 1/1997 | Sadlowski | 510/230 |
| 5,658,993 | A | | 8/1997 | Denzinger et al. | 525/285 |
| 5,747,440 | A | | 5/1998 | Kellett et al. | 510/276 |
| 5,759,978 | A | | 6/1998 | Welch et al. | 510/230 |
| 5,814,242 | A | * | 9/1998 | Alvarez et al. | 252/186.39 |
| 5,888,419 | A | * | 3/1999 | Casella et al. | 252/186.39 |
| 5,891,837 | A | | 4/1999 | Baillely et al. | 510/309 |
| 6,248,707 | B1 | | 6/2001 | Doetsch et al. | 510/375 |

FOREIGN PATENT DOCUMENTS

| | | |
|---|---|---|
| CN | 1064885 A | 9/1992 |
| DE | 196 12 031 | 10/1996 |
| EP | 454 126 | 10/1991 |
| EP | 544 944 | 6/1993 |
| GB | 2 138 439 | 10/1984 |
| WO | 92/21744 | 12/1992 |

OTHER PUBLICATIONS

PCT Search Report in a PCT application PCT/EP 03/07125.
Derwent Abstract of DE 196 12 031 published Oct. 17, 1996.

* cited by examiner

*Primary Examiner*—Joseph D. Anthony
(74) *Attorney, Agent, or Firm*—Rimma Mitelman

(57) ABSTRACT

Dry bleach compositions particularly suitable for cleaning of hard surfaces or fabrics which, upon mixing with water, form a mixture that is easily removed from surfaces upon standing.

6 Claims, No Drawings

DRY BLEACH COMPOSITIONS

FIELD OF THE INVENTION

The present invention relates to dry bleach compositions, especially useful for cleaning hard surfaces or fabrics.

BACKGROUND OF THE INVENTION

Dry bleach compositions for household use generally differ from typical laundry or hard surface cleaners in that they contain an increased level of bleach, and are typically used for stain removal from surfaces such as hard surfaces (e.g., in the kitchen or bathroom) or fabrics (e.g., laundry). The dry bleach compositions may employ a peroxy bleach. Particularly suitable, due to lower cost, is sodium perborate because it is stable within the composition. By contrast, percarbonate typically requires coating and, thus, can be more expensive and less stable.

U.S. Pat. No. 4,650,599 (Farnworth et al.) discloses free flowing laundry powder compositions containing 4–50% surfactant, 5–50% perborate and 5–80% carbonate. Chinese patent CN 1064885 discloses brushing powder and dry cleaning paste which may contain 2–30% surfactant, 0–4% perborate and either sodium carbonate or sodium sulfate in a range of 0–15%. Example 9 is a dry cleaning powder containing, among other ingredients, 90% starch and talc, 4.5% surfactant, 2% carbonate, 3% anhydrous sulfate and 0.4% perborate. WO 92/21744 discloses dry bleach composition, to be used as an additive in the laundry, with improved dispersability containing 5–50% perborate, 25–80% carbonate, optionally sulfate in an amount of 0–80%, preferably 10–50%, and optionally up to 5% surfactant.

Typically, the compositions are used as adjuncts in cleaning or laundry. A commercial bleaching multi-purpose stain remover product is "all" Oxi-active®, containing a mixture of perborate and carbonate. The consumers are directed to mix the "all" Oxi-active® powder with some water and then apply the resulting solution or paste to a stain or a surface area in need of cleaning. Consumers do not necessarily wash off the applied paste right away, perhaps believing that cleaning/stain removal will be more effective if the paste is left on the surface for some time. It has been found, as part of the present invention, that, unfortunately, compositions which contain high levels of perborate and carbonate, cake-up and harden upon standing, forming a hard crust that is difficult to remove by mechanical means and/or which might not be readily dispersible in the laundry machine, particularly when cold water is employed.

SUMMARY OF THE INVENTION

The present invention includes a dry bleach composition comprising:

(a) from about 10% to about 80%, by weight of the composition, of sodium perborate;

(b) from about 10% to about 50%, by weight of the composition, of an anhydrous carbonate salt;

(c) from about 3% to about 40%, by weight of the composition, of an anhydrous sodium sulfate;

(d) from about 0% to about 3%, by weight of the composition, of a detergent surfactant.

Another aspect of the present invention is the paste which results from combining the inventive dry bleach composition with water.

Yet another aspect of the present invention are methods of cleaning surfaces with the inventive dry bleaching compositions.

Surprisingly, the inclusion of sulfate in certain ratios to carbonate prevents the hardening of the perborate/carbonate product when diluted with water.

DETAILED DESCRIPTION OF THE INVENTION

Except in the operating and comparative examples, or where otherwise explicitly indicated, all numbers in this description indicating amounts of material or conditions of reaction, physical properties of materials and/or use are to be understood as modified by the word "about." All amounts are by weight of the final composition, unless otherwise specified.

It should be noted that in specifying any range of concentration, any particular upper concentration can be associated with any particular lower concentration.

For the avoidance of doubt the word "comprising" is intended to mean "including" but not necessarily "consisting of" or "composed of." In other words, the listed steps or options need not be exhaustive.

"Dry" means that that the composition is powdered or granular, dry-blended, as opposed to liquid.

"Anhydrous" means that water of hydration is always less than 0.5 molecule of water per molecule of salt.

"Paste" means a mixture that results from combining the inventive compositions with from about 20% to about 80% water; it may be runny or somewhat hard.

Perborate

Sodium perborate suitable for use in the present invention may be in the form of tetrahydrate or monohydrate. Monohydrate is preferred, due to better stability and cost effectiveness. Sodium perborate is employed in an amount of from 10 to 80%, preferably, in order to attain improved cleaning/stain removal from 30 to 60%, most preferably from 35 to 45%, optimally to attain maximum cleaning at minimum cost, at about 50%.

Carbonate Salt

Suitable carbonate salt is preferably selected from alkali-metal carbonates, sesquicarbonates and bicarbonates. Preferred are sodium and/or potassium carbonates, most preferably sodium carbonate due to better cost effectiveness. The carbonate salt acts as the builder to remove divalent metal ions such as calcium, and additionally provides alkalinity and aids in soil removal.

Both the carbonate and the sulfate included in the present invention are anhydrous, in order to minimize excessive caking and improve the ease of dissolution in the laundry and/or removal from hard surfaces. Thus the sulfate and the carbonate, each contain less than 0.5 molecule of water per molecule of salt.

The carbonate salt is employed in an amount of from 10 to 50%, preferably, in order to attain improved cleaning/stain removal from 12.5 to 45%, most preferably from 15 to 45%.

Sulfate

Sodium sulfate is included in the inventive compositions in an amount of from 3 to 40%, in order to obtain a composition which does not harden extensively when mixed with water and let stand, and yet is not excessively crumbly or crystalline. Preferably, the sulfate is included in an amount of at least 5%, most preferably from 5 to 37.5%.

The preferred inventive compositions, in order to attain optimum cleaning and optimum paste properties include the carbonate and the sulfate in a ratio from 1:5 to 10:1, most preferably from 1:3 to 7:1.

The inventive compositions are bleach compositions, thius they are preferebly formulated to not include substantial amounts of ingredients other than perborate, the carbonate salt and the sulfate. Preferably, the total amount of perborate, alkaline builder, and sulfate in the inventive compositions is at least 90%, preferably at least 95%, and most preferably at least 98%.

Optional Detergent Surfactant

The inventive compositions preferably do not include a detergent surfactant, particularly when they are intended for hard surface cleaning include less than 3%, preferably less than 2%, most preferably less than 1%.

When included, surface active agents may be selected from the group consisting of anionic, nonionic, cationic, amphoteric and zwitterionic surfactants or mixtures thereof.

Anionic surface active agents which may be used in the present invention are those surface active compounds which contain a long chain hydrocarbon hydrophobic group in their molecular structure and a hydrophilic group, i.e. water solubilizing group such as carboxylate, sulfonate or sulfate group or their corresponding acid form. The anionic surface active agents include the alkali metal (e.g. sodium and potassium) water soluble higher alkyl aryl sulfonates, alkyl sulfonates, alkyl sulfates and the alkyl poly ether sulfates. They may also include fatty acid or fatty acid soaps. One of the preferred groups of anionic surface active agents are the alkali metal, ammonium or alkanolamine salts of higher alkyl aryl sulfonates and alkali metal, ammonium or alkanolamine salts of higher alkyl sulfates. Preferred higher alkyl sulfates are those in which the alkyl groups contain 8 to 26 carbon atoms, preferably 12 to 22 carbon atoms and more preferably 14 to 18 carbon atoms. The alkyl group in the alkyl aryl sulfonate preferably contains 8 to 16 carbon atoms and more preferably 10 to 15 carbon atoms. A particularly preferred alkyl aryl sulfonate is the sodium, potassium or ethanolamine $C_{10}$ to $C_{16}$ benzene sulfonate, e.g. sodium linear dodecyl benzene sulfonate. The primary and secondary alkyl sulfates can be made by reacting long chain alpha-olefins with sulfites or bisulfites, e.g. sodium bisulfite. The alkyl sulfonates can also be made by reacting long chain normal paraffin hydrocarbons with sulfur dioxide and oxygen as describe in U.S. Pat. Nos. 2,503,280, 2,507,088, 3,372,188 and 3,260,741 to obtain normal or secondary higher alkyl sulfates suitable for use as surfactant detergents.

Additional Optional Ingredients

In additional to the optional surfactant, the inventive compositions may include additional peroxy bleaches, such as percarbonate, bleach activators, and additional builders.

Certain zeolites or aluminosilicates can be used. One such aluminosilicate which is useful in the compositions of the invention is an amorphous water-insoluble hydrated compound of the formula $Na_x(AlO_2)_ySiO_2$, wherein x is a number from 1.0 to 1.2 and y is 1, said amorphous material being further characterized by a Mg++ exchange capacity of from about 50 mg eq. $CaCO_3$/g. and a particle diameter of from about 0.01 micron to about 5 microns. This ion exchange builder is more fully described in British Pat. No. 1,470,250.

A second water-insoluble synthetic aluminosilicate ion exchange material useful herein is crystalline in nature and has the formula $Na_z[(AlO_2)_y.(SiO_2)]xH_2O$, wherein z and y are integers of at least 6; the molar ratio of z to y is in the range from 1.0 to about 0.5, and x is an integer from about 15 to about 264; said aluminosilicate ion exchange material having a particle size diameter from about 0.1 micron to about 100 microns; a calcium ion exchange capacity on an anhydrous basis of at least about 200 milligrams equivalent of $CaCO_3$ hardness per gram; and a calcium exchange rate on an anhydrous basis of at least about 2 grains/gallon/minute/gram. These synthetic aluminosilicates are more fully described in British Patent No. 1,429,143.

When intended as a laundry adjunct, the inventive composition may further include one or more well-known laundry ingredients, anti-redeposition agents, fluorescent dyes, perfumes, soil-release polymers, colorant, enzymes, bleaches, bleach precursors, buffering agents, antifoam agents, UV-absorbers, etc.

Optical brighteners for cotton, polyamide and polyester fabrics can be used. Suitable optical brighteners include Tinopal, stilbene, triazole and benzidine sulfone compositions, especially sulfonated substituted triazinyl stilbene, sulfonated naphthotriazole stilbene, benzidene sulfone, etc., most preferred are stilbene and triazole combinations. A preferred brightener is Stilbene Brightener N4 which is a dimorpholine dianilino stilbene sulfonate.

Also, soil release polymers and cationic softening agents may be used.

Examples of optional ingredients suitable for both laundry and hard surface inventive compositions include but are not limited to anti-foam agents (e.g. silicone compounds, such as Silicane L 7604), bactericides, e.g. tetrachlorosalicylanilide and hexachlorophene, fungicides, dyes, pigments (water dispersible), preservatives, e.g. formalin, ultraviolet absorbers, anti-yellowing agents, such as sodium carboxymethyl cellulose, pH modifiers and pH buffers, color safe bleaches, perfume and dyes and bluing agents such as Iragon Blue L2D, Detergent Blue 472/372 and ultramarine blue can be used.

The list of optional ingredients above is not intended to be exhaustive and other optional ingredients which may not be listed, but are well known in the art, may also be included in the composition.

Process of Making Composition

The inventive compositions are made by dry-mixing the ingredients.

Paste

The invention also includes a mixture ("paste") that results from mixing the inventive dry bleach composition with 20–80%, preferably from 30 to 70%, most preferably from 40 to 60%, by weight of the paste, of water. Preferred paste compositions, in order to attain optimum paste-like consistency and to minimize hardening upon standing incorporate all the preferred embodiments, amounts and ratios for the bleach composition as described above.

Method of Use

The compositions are intended to be used as adjuncts, or independently, for cleaning of fabrics (e.g., laundry, carpets, draperies) or hard surfaces (e.g., in the bathroom or kithchen). Preferably the bleaching paste is prepared, as described hereinabove, applied to the surface, especially, a stain, and then allowed to remain on the surface for a reasonable amount of time (e.g. from about 5 minutes to about 1 hour), and then washed off the surface.

The following specific examples further illustrate the invention, but the invention is not limited thereto.

EXAMPLES 1–5 AND COMPARATIVE EXAMPLES A–C

The following formulations were dry-blended:

| Ingredient | A | B | 1 | 2 | 3 | 4 | 5 | C |
|---|---|---|---|---|---|---|---|---|
| Sodium perborate monohydrate (ex Solvay) | 50 | 50 | 50 | 50 | 50 | 50 | 50 | 50 |
| Anhydrous sodium sulfate (ex Oxychem) | 50 | 43.75 | 37.5 | 25 | 12.5 | 6.25 | 3.13 | 0 |
| Anhydrous sodium carbonate (ex OCI) | 0% | 6.25 | 12.5 | 25 | 37.5 | 43.75 | 46.87 | 50 |
| Weight ratio of carbonate to sulfate | 0 | 1:7 | 1:3 | 1:1 | 3:1 | 7:1 | 15:1 | — |
| Results after 5 minutes | Hard crust | Paste | Paste | Paste | Paste | Paste | Paste | Hard crust |
| Results after 1 hour | Hard crust | Crumbly | Paste, but harder | Paste | Paste | Paste | Runny/ crystal-line | Hard crust |

1 part of each mixture was blended with 1 part cold tap water. The mixture was then poured onto a flat plastic surface to dry. The poured formulations were observed at 5 minutes and 1 hour drying time.

After 5 minutes drying time formulations A and C left a hard crust that was difficult to remove by mechanical means, although it could be rinsed off in hard water. Formulations B, 1, 2, 3, 4, and 5 were still in paste form and easily removed by wiping from the surface.

After 1 hour, formulation B was crumbly, formulation 1 was a harder paste, but still pliable, and the remainder of the formulations were still pliable. However, formulation 5 became runny and had significant crystal formation. The most desirable formulations were 1 through 4.

The examples demonstrate that blending sulfate and carbonate with perborate within the claimed ranges results in a hard surface cleaner that is easier to remove from surfaces upon standing.

What is claimed is:

1. A dry bleach composition comprising:

(a) from about 30% to about 60%, by weight of the composition, of sodium perborate;

(b) from about 10% to about 50%, by weight of the composition, of an anhydrous salt, wherein the salt is selected from the group consisting of alkali metal carbonates, sesquicarbonates and bicarbonates;

(c) from about 3% to about 40%, by weight of the composition, of an anhydrous sodium sulfate;

wherein the total amount of the perborate, the salt (b), and the sulfate is at least about 98%, by weight of the composition; wherein the weight ratio of the salt (b) to the sulfate (c) is in the range of from about 1:3 to about 7:1.

2. The composition of claim 1 wherein the composition comprises at least about 5% of the sulfate.

3. The composition of claim 1 wherein the composition further comprises a surfactant and the amount of the surfactant is less than about 2%, by weight of the composition.

4. The composition of claim 1 wherein the perborate amount is about 50%, by weight of the composition.

5. The composition of claim 1 wherein the composition is a laundry adjunct.

6. The composition of claim 1 wherein the composition is a hard surface cleaner.

* * * * *